Patented June 24, 1930

1,767,302

UNITED STATES PATENT OFFICE

RICHARD MICHEL, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF CONDENSATION PRODUCTS FROM OLEFINES AND NAPHTHALENE HYDROCARBON COMPOUNDS

No Drawing. Application filed August 14, 1928, Serial No. 299,635, and in Germany August 22, 1927.

The invention relates to the manufacture of condensation products from naphthalene hydrocarbon compounds and olefines and further relates to a process of separating ethylene from its higher homologues.

As I have set forth in my U. S. Patent No. 1,667,214 issued April 24th, 1928 homologues or condensation products of naphthalene hydrocarbon compounds are obtained by reacting with olefines upon naphthalene hydrocarbon compounds under conditions of elevated temperature and super-atmospheric pressure and it has there also been suggested that the homologues of ethylene react more readily than ethylene itself.

The present invention represents a further development and in accordance therewith I have found that the homologous olefines such as propylene, butylene and the like will react with naphthalene hydrolene, homologous naphthalenes e. g. α- or carbon compounds as for example naphtha-6-methyl naphthalene, partially hydrogenated naphthalenes, halogenated naphthalenes such as α- or 6-chloro-naphthalene and the like, in the presence of catalytically acting substances at normal or even reduced pressure, whilst the temperature can be reduced below the lower limits specified in my above-mentioned patent, even to room-temperature and below. Under these milder conditions ethylene for all practical purposes does not enter in reaction while it is easy to unite the higher homologues quantitatively to the naphthalene nucleus. Thus, starting from gas mixtures containing ethylene, homologues thereof and possibly other gases, that is for example oil gas, gaseous mixtures from oil cracking operations and the like, the formation of valuable naphthalene derivatives is accompanied by a separation of the unsaturated constituents of the gas and a residual gas is obtained which can readily be worked up further to pure ethylene derivatives as for example ethylene chlorhydrin, ethylene glycol and the like.

Among the catalytically acting substances which have been found effective in uniting olefines with naphthalene hydrocarbon compounds are metallic halides particularly aluminium chloride and iron chloride, and addition compounds of, say, aluminium halides and olefines. With either of these catalysts there may be combined also other substances capable of promoting the reaction such as for example benzene hydrocarbons and halogen acids.

The resulting products are alkylated naphthalene hydrocarbon compounds and are found to consist predominantly or apparently exclusively of those having secondary alkyl residues. According to the relative proportions of the gas mixture and the naphthalene hydrocarbon compound used the final product contains as the principal constituent compounds with either one side chain or several side chains in respect to each molecule of the naphthalene hydrocarbon compound.

The following examples will illustrate my invention. The parts are by weight.

Example 1.

128 parts of naphthalene are melted and after adding 4 parts of anhydrous aluminium chloride a current of pure propylene is led in at 80° C. with stirring. The propylene is completely absorbed. The reaction is interrupted when the increase in weight reaches 168 parts and after distillation of the crude product, from which the aluminium chloride is with advantage first removed in the known manner, for example by washing with water, a mixture of various propyl naphthalenes is obtained, which on cooling partly remain oily and partly solidify to a crystalline mass. The crystals consist of a hydrocarbon of the probable composition $C_{22}H_{32}$, which may be regarded as tetra-isopropylnaphthalene. Analysis gives the following results:— Melting point: 125–126° C.

| | C found: | 89.4% | calculated: | 89.1% |
|---|---|---|---|---|
| | H " | 10.8% | " | 10.9% |
| Molecular weight | " | 291 | " | 296. |

Example 2.

Propylene gas is introduced into a mixture of 128 parts of melted naphthalene and 4 parts of anhydrous aluminium chloride at a temperature of from 110 to 120° C. and under a pressure of about 500 mm. mercury. When an increase in weight of about 168 parts is attained, reaction is interrupted and further treatment as shown in Example 1 yields the same products as those of Example 1.

*Example 3.*

128 parts by weight of naphthalene are condensed with propylene as described in Example 1, but the reaction is interrupted when the increase in weight amounts to only 42 parts. The product remains liquid on cooling. After the addition of a further one to two parts by weight of aluminium chloride the product is treated with butylene (a mixture of 1:2- and 2:3-butylene) at 20° C. with stirring. The butylene is completely absorbed and according to the quantity introduced oils are obtained, containing besides an isopropyl group one or several secondary butyl groups in the naphthalene nucleus.

*Example 4.*

256 parts of naphthalene and 5 parts of anhydrous aluminium chloride are heated to 80° C. and treated with butylene until the mixture forms a viscous paste at ordinary temperature. Then introducing butylene is continued whilst cooling the mixture to from 5 to 10° C. until the total increase in weight amounts to 260 parts. Distillation in vacuo yields a principal fraction boiling from 200 to 250° C. at 20 mm. pressure which consists of buyl naphthalenes containing several side chains and being clear highly viscous oils.

*Example 5.*

128 parts of molten naphthalene are treated as described in Example 1 with an oil gas, containing from about 15% to 25% of ethylene, from 8% to 15% of propylene and from 2% to 5% of butylene and higher homologues. The velocity of the gas current can be readily regulated thus, that the escaping gas contains only fractions of 1% of olefines other than ethylene, while for all practical purposes the whole of the ethylene present in the original gas is recovered. By interrupting the reaction after an increase in weight of 40–50 parts and distillation there is obtained besides a little unchanged naphthalene a product, consisting mainly of mono-isopropylnaphthalene with less diisopropylnaphthalene besides small quantities of the corresponding secondary butyl naphthalenes. The escaping ethylene containing gas can be further treated, for example with hypochlorous acid to form ethylene chlorhydrin or worked up to other pure ethylene derivatives.

*Example 6.*

To 250 parts by weight of tetrahydronaphthalene 12.5 parts by weight of aluminium chloride are added. A current of propylene gas is led into this mixture at 20 to 30° C. with stirring until the weight has increased by about 140 parts. Distillation yields an odorless transparent oil distilling at 150 to 200° C. under 20 mm. pressure.

*Example 7.*

Propylene is led under normal atmospheric pressure into 1200 parts of ar-monochlorotetrahydronaphthalene (obtainable by chlorinating tetrahydronaphthalene at a low temperature) and 50 parts of aluminium chloride whereupon the temperature rises to 90 to 100° C., which is there maintained without external application of heat. The current of gas is interrupted as soon as the increase in weight amounts to 700 parts. Distillation in vacuo yields clear oils of a middle viscosity consisting of propylated ar-chlorotetrahydronaphthalene.

In the following claims the generic term "naphthalene hydrocarbon" is used to denote naphthalene and its homologues and partially hydrogenated derivatives thereof either singly or in admixture. Halogenated naphthalene hydrocarbons are considered to be equivalents of the aforesaid naphthalene hydrocarbons for carrying out this invention.

I claim:

1. Process which comprises reacting with an olefine containing at least three carbon atoms upon a naphthalene hydrocarbon in the presence of a catalytically active metallic halide under a pressure not essentially exceeding normal atmospheric pressure.

2. Process which comprises reacting with an olefine containing at least three carbon atoms upon a naphthalene hydrocarbon in the presence of a catalytically active metallic chloride under a pressure not essentially exceeding normal atmospheric pressure and at a temperature not exceeding 100° C.

3. Process which comprises reacting with an olefine containing at least three carbon atoms upon a naphthalene hydrocarbon in the presence of aluminium chloride under a pressure not essentially exceeding normal atmospheric pressure and at a temperature below 100° C.

4. Process which comprises reacting with an olefinic gas containing a higher homologue of ethylene upon a naphthalene hydrocarbon in the presence of a catalytically active metallic halide under a pressure not essentially exceeding normal atmospheric pressure and at a temperature below 100° C.

5. Process which comprises reacting with an olefinic gas containing ethylene and a higher homologue of ethylene upon a naphthalene hydrocarbon in the presence of a catalytically active metallic halide, under a pressure not essentially exceeding normal atmospheric pressure and at a temperature below 100° C.

6. Process which comprises reacting upon naphthalene with a gas having an olefine content of about 27% to 45% of which about 15% to 25% is ethylene and the remaining part consists of higher homologues of ethylene in the presence of a catalytically active metallic halide under a pressure not essentially exceeding normal atmospheric pressure and at a temperature below 100° C.

In testimony whereof I have hereunto set my hand.

RICHARD MICHEL.

CERTIFICATE OF CORRECTION.

Patent No. 1,767,302.          Granted June 24, 1930, to

RICHARD MICHEL.

It is hereby certified that error appears in the printed specification of the above numbered patent requiring correction as follows: Page 1, strike out line 21, and insert the same to follow line 22, the lines having been transposed; and that the said Letters Patent should be read with this correction therein that the same may conform to the record of the case in the Patent Office.

Signed and sealed this 9th day of September, A. D. 1930.

(Seal)

M. J. Moore,
Acting Commissioner of Patents.

higher homologue of ethylene upon a naphthalene hydrocarbon in the presence of a catalytically active metallic halide, under a pressure not essentially exceeding normal atmospheric pressure and at a temperature below 100° C.

6. Process which comprises reacting upon naphthalene with a gas having an olefine content of about 27% to 45% of which about 15% to 25% is ethylene and the remaining part consists of higher homologues of ethylene in the presence of a catalytically active metallic halide under a pressure not essentially exceeding normal atmospheric pressure and at a temperature below 100° C.

In testimony whereof I have hereunto set my hand.

RICHARD MICHEL.

---

CERTIFICATE OF CORRECTION.

Patent No. 1,767,302.   Granted June 24, 1930, to

RICHARD MICHEL.

It is hereby certified that error appears in the printed specification of the above numbered patent requiring correction as follows: Page 1, strike out line 21, and insert the same to follow line 22, the lines having been transposed; and that the said Letters Patent should be read with this correction therein that the same may conform to the record of the case in the Patent Office.

Signed and sealed this 9th day of September, A. D. 1930.

(Seal)

M. J. Moore,
Acting Commissioner of Patents.